(12) United States Patent
Sagerer

(10) Patent No.: US 12,311,747 B2
(45) Date of Patent: May 27, 2025

(54) HIGH-VOLTAGE STORAGE DEVICE FOR A MOTOR VEHICLE

(71) Applicant: Bayerische Motoren Werke Aktiengesellschaft, Munich (DE)

(72) Inventor: Matthias Sagerer, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 251 days.

(21) Appl. No.: 17/914,784

(22) PCT Filed: Jun. 2, 2021

(86) PCT No.: PCT/EP2021/064757
§ 371 (c)(1),
(2) Date: Sep. 27, 2022

(87) PCT Pub. No.: WO2021/245123
PCT Pub. Date: Dec. 9, 2021

(65) Prior Publication Data
US 2023/0132607 A1 May 4, 2023

(30) Foreign Application Priority Data
Jun. 3, 2020 (DE) .................. 10 2020 114 757.0

(51) Int. Cl.
*B60K 1/04* (2019.01)
*B60L 50/64* (2019.01)
*B62D 21/15* (2006.01)

(52) U.S. Cl.
CPC .............. *B60K 1/04* (2013.01); *B60L 50/64* (2019.02); *B62D 21/157* (2013.01); *B60K 2001/0438* (2013.01)

(58) Field of Classification Search
CPC ... B60K 1/04; B60K 2001/0438; B60L 50/64; B62D 21/157
See application file for complete search history.

(56) References Cited

U.S. PATENT DOCUMENTS 9,061,712 B2* 6/2015 Patberg ............... B62D 21/157
11,097,679 B2* 8/2021 Sakai .................. B62D 25/08
(Continued)

FOREIGN PATENT DOCUMENTS

CN 109664743 A 4/2019
DE 10 2010 033 123 A1 2/2012
(Continued)

OTHER PUBLICATIONS

International Search Report (PCT/ISA/210) issued in PCT Application No. PCT/EP2021/064757 dated Sep. 24, 2021 with English translation (five (5) pages).
(Continued)

*Primary Examiner* — Bryan A Evans
(74) *Attorney, Agent, or Firm* — Crowell & Moring LLP

(57) ABSTRACT

A high-voltage storage device for a motor vehicle includes a plurality of battery cells, a housing element on which the battery cells are held, and at least one longitudinal member on which the housing element is held and which has a safety distance from the battery cells in a distance direction. The longitudinal member has at least one predetermined deformation zone, the design of which zone allows predetermined deformation of the longitudinal member to be defined when force is applied to the longitudinal member in the distance direction, as a result of which the safety distance can be maintained.

5 Claims, 3 Drawing Sheets

(56) References Cited

U.S. PATENT DOCUMENTS

| | | | |
|---|---|---|---|
| 11,161,549 B2* | 11/2021 | Sakai | B62D 21/07 |
| 11,241,948 B2* | 2/2022 | Morimoto | B62D 25/08 |
| 2007/0257519 A1 | 11/2007 | Hanson, Jr. et al. | |
| 2016/0347160 A1 | 12/2016 | Landgraf | |
| 2017/0355255 A1 | 12/2017 | Brausse et al. | |
| 2020/0140021 A1 | 5/2020 | Grottke et al. | |
| 2021/0146766 A1 | 5/2021 | Haberl et al. | |
| 2022/0016966 A1 | 1/2022 | Kecalevic et al. | |
| 2022/0032758 A1* | 2/2022 | Kaneko | B62D 21/11 |

FOREIGN PATENT DOCUMENTS

| | | | | |
|---|---|---|---|---|
| DE | 10 2013 008 428 A1 | 12/2014 | | |
| DE | 10 2014 001 289 B3 | 5/2015 | | |
| DE | 102015012257 A1 * | 4/2016 | | B60K 1/04 |
| DE | 10 2015 117 466 A1 | 4/2017 | | |
| DE | 102013008428 B4 * | 5/2017 | | B60K 1/04 |
| DE | 10 2016 110 787 A1 | 12/2017 | | |
| DE | 10 2018 206 100 A1 | 10/2019 | | |
| DE | 10 2018 127 375 A1 | 5/2020 | | |
| DE | 10 2018 132 258 A1 | 6/2020 | | |
| DE | 10 2019 102 226 A1 | 7/2020 | | |
| DE | 10 2019 104 647 A1 | 8/2020 | | |
| FR | 3 078 048 A1 | 8/2019 | | |
| JP | 2017196952 A * | 11/2017 | | |

OTHER PUBLICATIONS

German-language Written Opinion (PCT/ISA/237) issued in PCT Application No. PCT/EP2021/064757 dated Sep. 24, 2021 (six (6) pages).

German-language Search Report issued in German Application No. 10 2020 114 757.0 dated Apr. 29, 2021 with partial English translation (11 pages).

English translation of Chinese-language Office Action issued in Chinese Application No. 202180023131.X dated Feb. 28, 2025 (6 pages).

* cited by examiner

HIGH-VOLTAGE STORAGE DEVICE FOR A MOTOR VEHICLE

BACKGROUND AND SUMMARY

The invention relates to a high-voltage storage device for a motor vehicle.

DE 10 2016 110 787 A1 discloses a battery housing of a traction battery of a motor vehicle, which is integrated into a substructure of the motor vehicle. This battery housing comprises at least one base plate and two side walls, between which a number of receiving spaces are formed, within which at least one battery module is received. A number of deformation elements spaced apart from one another in the longitudinal direction of the motor vehicle are attached to the inner sides of the side walls, such that lateral deformation spaces are formed between the battery modules and the side walls in the region of the deformation elements. The deformation elements can be deformed in a crash and can absorb energy in the process. This prevents the battery modules themselves from coming into direct contact with the side walls of the battery housing.

Moreover, DE 10 2014 001 289 B3 discloses a motor vehicle with a plurality of battery elements, which are present in modules of a first type and a second type for the plurality of battery elements. In a module of the first type, the battery elements are arranged in a group so as to be deformable and displaceable relative to one another as a function of the action of a force. In a module of the second type, the arrangement of the battery elements is displaceable in a non-destructive manner depending on the action of a force, only retaining its shape. In the event of a lateral impact, a sill can be pressed into the module of the first type, which thereby displaces in a group-deforming manner and converts kinetic energy. The acting force is thus partially converted into a deformation by deformation of the sill and other body parts of the motor vehicle and by displacement of the battery elements which are arranged in the module of the first type.

The object of the present invention is to provide a high-voltage storage device for a motor vehicle, by means of which battery cells of the high-voltage storage device can be protected particularly advantageously against damage in the event of an accident.

The object is achieved in accordance with the invention by a high-voltage storage device for a motor vehicle having the features of the independent claim. Advantageous embodiments of the invention are the subject of the dependent claims and the description.

The invention relates to a high-voltage storage device for a motor vehicle, comprising a plurality of battery cells. By means of the high-voltage storage device, electrical energy can be provided for an electrical drive system of the motor vehicle. The high-voltage storage device further comprises a housing element on which the battery cells are held. In particular, the battery cells can be placed on the housing element. The high-voltage storage device further comprises at least one longitudinal member on which the housing element is held. The longitudinal member is in particular a longitudinal profile by means of which the high-voltage storage device can be stabilized in a longitudinal direction. In particular, the longitudinal member comprises a plurality of profiles which run parallel to one another with their longitudinal direction of extent and which in particular can be formed as hollow profiles with a corresponding profile cross section. In particular, the high-voltage storage device comprises at least two longitudinal members arranged on opposite outer sides of the housing element. The at least one longitudinal member has at least a specified safety distance from the battery cells in a distance direction. Here, a distance between the longitudinal member and the battery cells of the high-voltage storage device in the distance direction can have exactly the safety distance or a distance which is greater than the safety distance. This safety distance is a so-called survival space of the battery cells, which can be specified by a dynamic distance of the high-voltage storage device.

In order to be able to ensure that the safety distance is reliably maintained, it is provided in accordance with the invention that the longitudinal member has at least one target deformation region, the design of which allows a target deformation of the longitudinal member to be specified when force is applied to the longitudinal member in the distance direction, as a result of which the safety distance can be maintained. This means that the longitudinal member has a special geometry in the target deformation region, via which a deformation of the longitudinal member is specified when force is applied to the longitudinal member from outside in the distance direction, which in turn ensures that the safety distance between the battery cells and the longitudinal member is at least substantially maintained when force is applied to the longitudinal member laterally in the distance direction. In particular, the target deformation range is designed in such a way that the safety distance is encroached upon when the longitudinal member is deformed, at least up to a specified limit force action on the longitudinal member in the distance direction. This means that in the event of an accident involving the vehicle with the high-voltage storage device, the risk of damage to the battery cell of the high-voltage storage device can be kept particularly low, which in turn means that the risk of injury to vehicle occupants of the vehicle with the high-voltage storage device can be kept particularly low.

In a further embodiment of the invention, it has been shown to be advantageous if the longitudinal member has at least one longitudinal groove and/or one milled portion and/or one bore in the target deformation region, by means of which the target deformation is specified. This means that the longitudinal member is provided with the longitudinal groove and/or the milled portion and/or the bore after it has been produced, for example, in an extrusion process. As a result of the at least one longitudinal groove and/or milled and/or bore in the longitudinal member in the target deformation region, the longitudinal member has a material weakening in the target deformation region. By means of this material weakening, a deformation of the longitudinal member when a force is applied laterally to the longitudinal member in the distance direction can be specified in a targeted manner. The targeted specification of the deformation can at least substantially ensure that the safety distance between the battery cells and the at least one longitudinal member is maintained when force is applied to the longitudinal member in the distance direction.

In a further embodiment of the invention, it has been shown to be advantageous if the longitudinal member has at least one concave profile shape and/or one convex profile shape in the target deformation region along the distance direction, by means of which the target deformation is specified. In other words the longitudinal member, in a target deformation region, has at least one profile which runs at an incline to the distance direction and which has a concave cross section and/or a convex cross section, by means of which the target deformation is specified. The profile runs with its longitudinal direction of extent in particular perpendicular to the distance direction. In this case, the profile runs with its longitudinal direction of extent in particular in the longitudinal direction of the vehicle having the high-voltage storage device. The profile is produced in particular by an extrusion process. In this case, the profile has a convex cross section and/or a concave cross section at least in portions, wherein the longitudinal member is locally weakened in a targeted manner via the concave cross section or the convex cross section, wherein a deformation direction of the longitudinal member in the target deformation region can be specified via the convex or the concave shape of the cross section.

In a further embodiment of the invention, it has been shown to be advantageous if the longitudinal member, in the target deformation region, has at least one profile which runs at an incline to the distance direction, in particular a profile which runs perpendicularly to the distance direction, and which has a cross section rising in the distance direction and/or a cross section falling in the distance direction, by means of which the target deformation is specified. This means that the longitudinal member has the at least one profile running with its longitudinal direction of extension in the vehicle longitudinal direction, which profile is produced in particular by the extrusion process, wherein the profile has the rising cross section and/or the falling cross section at least in a longitudinal region along the distance direction. In this case, the cross section rises or falls in the vehicle vertical direction. This means that the longitudinal member has an inclined cross section at least in the longitudinal region in the distance direction. In this case, in particular an upper side and/or a lower side of the longitudinal member in the longitudinal region are/is inclined in the distance direction and are/is thus formed so as to rise or fall along the distance direction in the vehicle vertical direction. The particular inclined orientation of the longitudinal member can be used to specify a deformation movement of the longitudinal member in the target deformation region when force is applied to the longitudinal member in the distance direction, as a result of which it is possible to at least substantially ensure that the safety distance between the battery cells of the high-voltage storage device and the at least one longitudinal member is maintained when force is applied.

In a further embodiment of the invention, it has been shown to be advantageous if the longitudinal member, in the target deformation region, has at least one profile which runs at an incline to the distance direction and which has a trapezoidal cross section, by means of which the target deformation is specified. This means that the longitudinal member has the at least one profile which is oriented with its longitudinal direction of extent in particular perpendicular to the distance direction and/or in the vehicle longitudinal direction. The trapezoidal cross section of the profile it is to be understood to mean that at least two opposite sides of the cross section are inclined and thus not parallel to each other. In addition, at least two opposite sides of the cross section have different lengths relative to each other along the periphery of the cross section. In particular, the cross section runs along a vehicle vertical direction as well as along a vehicle transverse direction of the motor vehicle and thus at least substantially perpendicular to the vehicle longitudinal direction of the motor vehicle. By means of the at least one profile of the longitudinal member having the trapezoidal cross section, a deformation movement of the longitudinal member can be specified particularly precisely in the event of a force acting on the longitudinal member in the distance direction from the outside and thus on a side of the longitudinal member opposite the high-voltage storage device. In particular, a displacement and/or bending and/or folding of the longitudinal member in the target deformation region can be specified, which ensures that the safety distance between the battery cells and the longitudinal member is maintained.

In a further embodiment of the invention, it has proven to be advantageous if the longitudinal member is an extruded profile and has at least one recess in the target deformation region, by means of which the target deformation is specified. The longitudinal member thus has at least one recess in the distance direction, which is in particular already provided during manufacture of the longitudinal member. By selecting a geometry and/or a position and/or an orientation of the recess, the deformation of the longitudinal member in the target deformation range when force is applied laterally to the longitudinal member in the distance direction can be specified. The targeted specification of the deformation movement of the longitudinal member when force is applied laterally to the longitudinal member in the distance direction ensures that the safety distance between the battery cells and the longitudinal member is at least substantially maintained when force is applied, which means that a particularly long service life of the battery cells and a particularly low risk of injury to vehicle occupants when force is applied laterally to the longitudinal member can be ensured.

Further features of the invention will become clear from the claims, the figures and the figure description. The features and combinations of features mentioned above in the description, as well as the features and combinations of features mentioned below in the figure description and/or shown alone in the figures, can be used not only in the combination indicated in each case, but also in other combinations or on their own.

The invention will now be explained in more detail with reference to a preferred exemplary embodiment and with reference to the drawings.

BRIEF DESCRIPTION OF THE DRAWINGS

Functionally like elements are assigned the same reference sign in the figures.

DETAILED DESCRIPTION OF THE DRAWINGS

Figure 1:
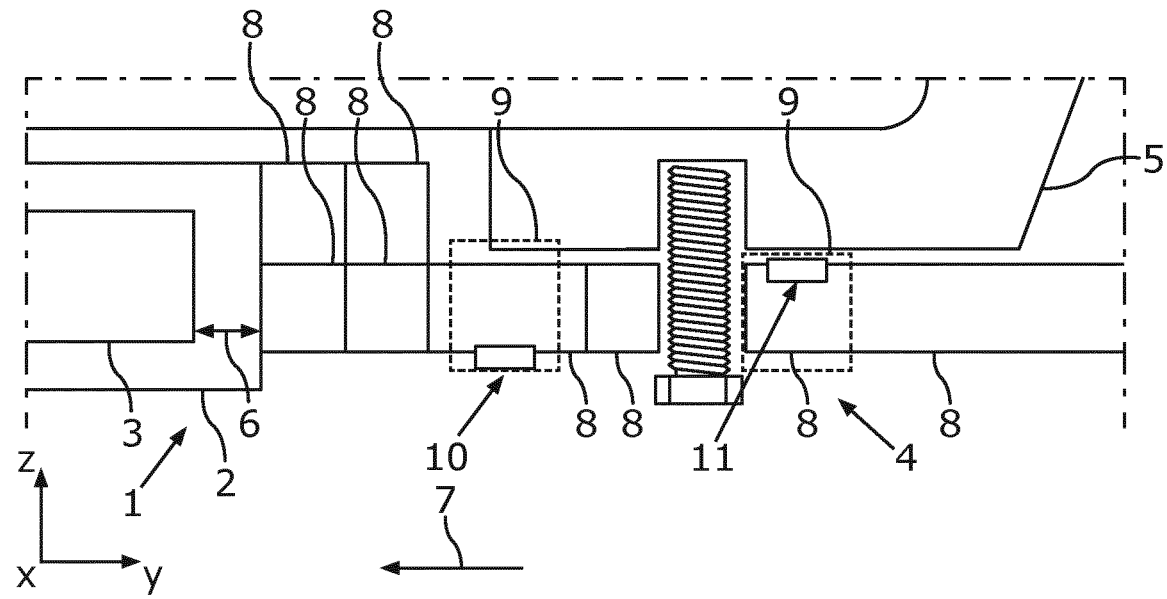
FIG. 1 is a schematic sectional view of a detail of a high-voltage storage device of a motor vehicle, wherein the high-voltage storage device comprises a housing element on which a plurality of battery cells are held, and in addition comprises at least one longitudinal member, by means of which the at least one housing element is stabilized and by means of which the high-voltage storage device can be fastened to a body-in-white of the motor vehicle, wherein the at least one longitudinal member is an extruded profile which has at least one longitudinal groove and/or a milled portion and/or a bore in a target deformation region, by means of which a target deformation of the longitudinal member is specified when a lateral force is applied to the longitudinal member.

In each of FIGS. 1 to 5, a detail of a high-voltage storage device 1 is shown in section. The high-voltage storage device 1 comprises at least one housing element 2 on which a plurality of battery cells 3 of the high-voltage storage device 1 are held. In the present case, the housing element 2 comprises at least one base plate on which the plurality of battery cells 3 are arranged. Electrical energy can be stored in the battery cells 3 and can be provided by the battery cells 3 for an electric drive of the motor vehicle having the high-voltage storage device 1. The high-voltage storage device 1 also comprises at least one, and in this case precisely two, longitudinal members 4, which are arranged on sides of the plurality of battery cells 3 that are opposite one another in the vehicle transverse direction y. The longitudinal members 4 can be used to attach the high-voltage storage device 1 to a body-in-white 5 of the motor vehicle.

In order to keep a risk of damage to the battery cells 3 in the high-voltage storage device 1 particularly low, in particular in the event of a lateral force acting on the longitudinal member 4, it is provided that the battery cells 3 have a safety distance 6 in a distance direction 7 from the next longitudinal member 4. In this case, the distance direction 7 runs in the vehicle transverse direction y. In particular, it is provided that the safety distance 6 between the longitudinal member 4 and the particular battery cells 3 closest to the longitudinal member 4 is maintained in an unloaded state of the longitudinal member 4 and in a state of the longitudinal member 4 to which a force is applied laterally, in particular in the distance direction 7.

The particular longitudinal member 4 is formed as an extruded profile comprising a plurality of adjacent profiles 8 with their longitudinal direction of extent parallel to one another and oriented in the vehicle longitudinal direction x. The profiles 8 are in particular hollow and have an angular cross section. The cross section is to be understood in particular as a section of the profiles 8 by means of a plane spanned by the vehicle vertical direction z and the vehicle transverse direction y, wherein these cross sections are shown in FIGS. 1 to 5. In order to be able to ensure that a safety distance 6 is maintained in each case in the event of the action of a force in the distance direction 7 on the longitudinal member 4 from the outside, it is provided that the longitudinal member 4 has at least one target deformation region 9, via the design of which a target deformation of the longitudinal member 4 in the event of the action of a force can be specified. A deformation movement or a deformation direction of the longitudinal member 4 when a force is applied laterally from the outside in the distance direction 7 to the longitudinal member 4 can be specified via a corresponding geometric embodiment of the at least one target deformation region 9 of the longitudinal member 4.

As shown in FIG. 1, the longitudinal member 4 can have a milled portion 10 and/or a longitudinal groove 11 in the target deformation region 9 for specifying the target deformation of the longitudinal member 4. Alternatively or additionally, the longitudinal member 4 can have at least one bore in the target deformation region 9, by means of which the target deformation of the longitudinal member 4 can be specified.

Figure 2:
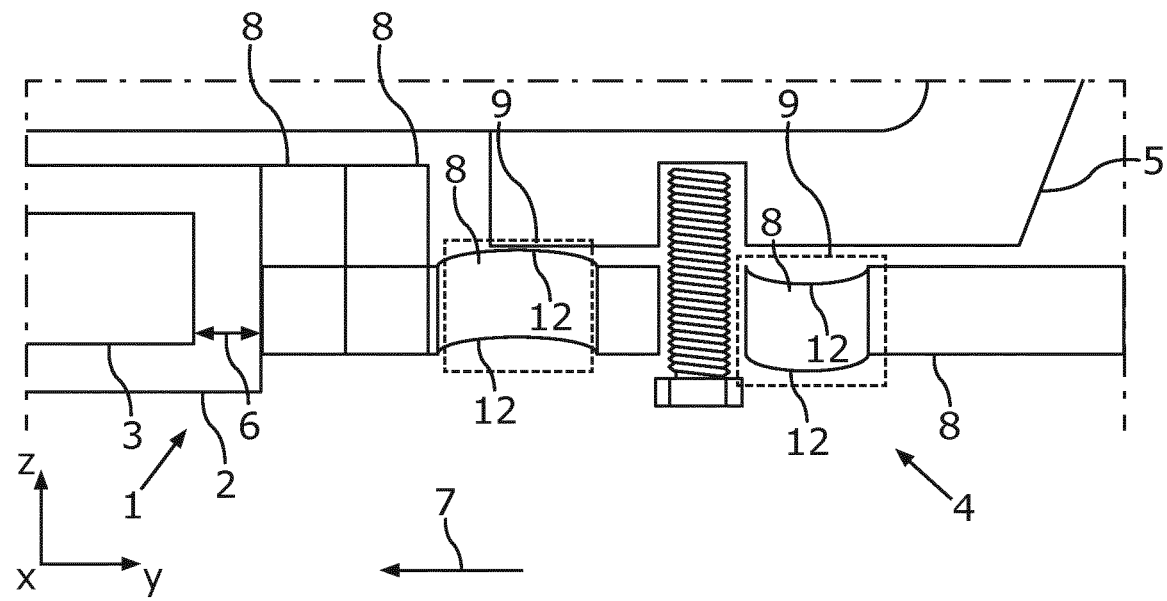
FIG. 2 is a schematic sectional view of the detail of the high-voltage storage device with the longitudinal member, which has at least one profile which runs with its longitudinal direction of extent in the vehicle longitudinal direction and which has a concave cross section and/or a convex cross section in the target deformation region, via which the target deformation of the longitudinal member when a lateral force is applied to the longitudinal member is specified.

In the embodiment of the longitudinal member 4 shown in FIG. 2, at least one of the profiles 8 of the longitudinal member 4 has a concave cross section or a convex cross section. The concave or convex cross section of the particular profile 8 of the longitudinal member 4 is to be understood to mean that at least one side wall 12 of the profile 8 delimiting the profile 8 is convex or concave, whereby the target deformation of the longitudinal member 4 can be specified particularly simply and precisely.

Figure 3:
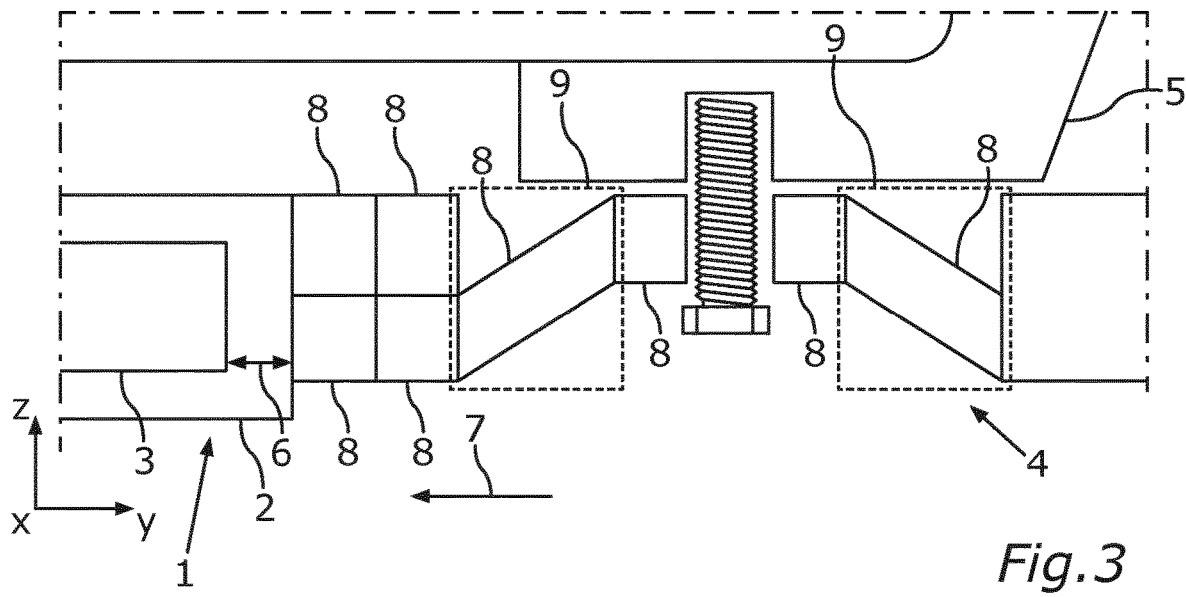
FIG. 3 is a schematic sectional view of the detail of the high-voltage storage device with the longitudinal member, which has at least one profile which runs with its longitudinal direction of extent in the vehicle longitudinal direction and which has a cross section rising in the vehicle transverse direction and a cross section falling in the vehicle transverse direction in the target deformation region, via which the target deformation of the longitudinal member when a lateral force is applied to the longitudinal member is specified.

In the embodiment of the longitudinal member 4 shown in FIG. 3, it is provided that at least one of the profiles 8 of the longitudinal member 4 has a rising or falling cross section in the distance direction 7. The rising or falling cross section of the profile 8 is to be understood to mean that a side wall lying further inwards in the vehicle transverse direction y and delimiting the profile 8 is arranged in the vehicle vertical direction z above or below the outer side wall lying opposite the inner side wall in the vehicle transverse direction y, wherein the side walls in each case delimit the profile 8 to the side. Thus, a side wall delimiting the profile 8 upwards or downwards in the vertical vehicle direction z can be designed to be rising or falling in the distance direction 7.

Figure 4:
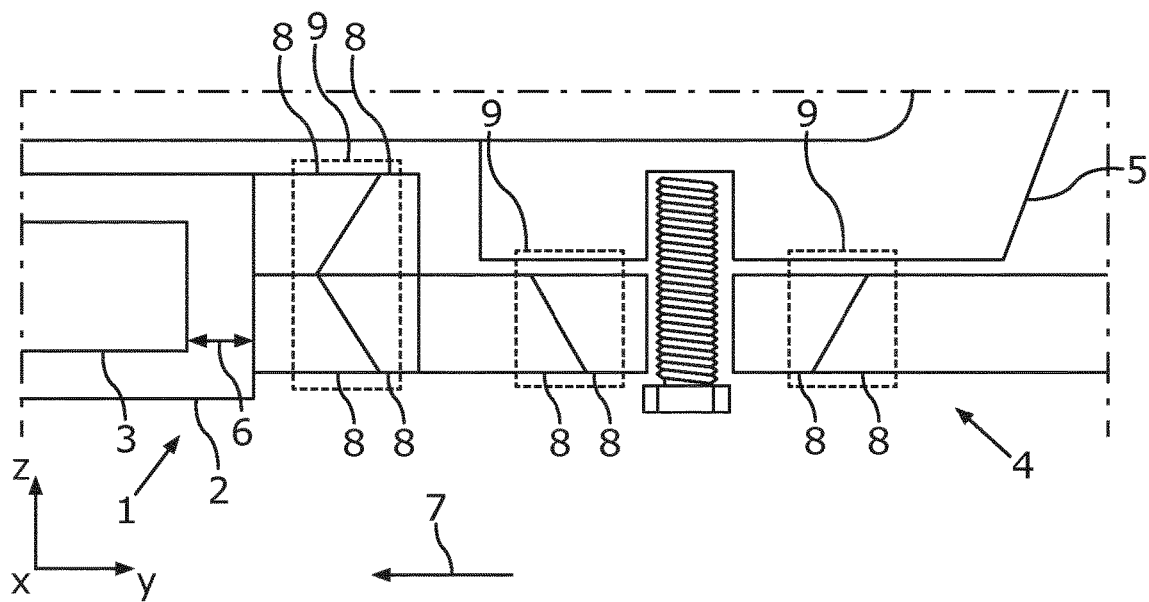
FIG. 4 is a schematic sectional view of the detail of the high-voltage storage device with the longitudinal member, which has at least one profile which runs with its longitudinal direction in the vehicle longitudinal direction and which has a trapezoidal cross section in the target deformation region, via which the target deformation of the longitudinal member when a lateral force is applied to the longitudinal member is specified.

In the embodiment of the longitudinal member 4 shown in FIG. 4, the longitudinal member 4 has at least one profile 8 with a trapezoidal cross section. For the trapezoidal cross section, at least two side walls delimiting the profile 8 on opposite sides are oriented at an angle to one another. In addition, at least two side walls delimiting the profile 8 on opposite sides are formed with different widths along the cross sectional periphery of the profile 8. In the embodiment of the longitudinal member 4 shown in FIG. 4, the longitudinal member 4 has a plurality of profiles 8 with respective trapezoidal cross sections, wherein the trapezoidal cross sections of the different profiles 8 are configured differently from one another.

Figure 5:
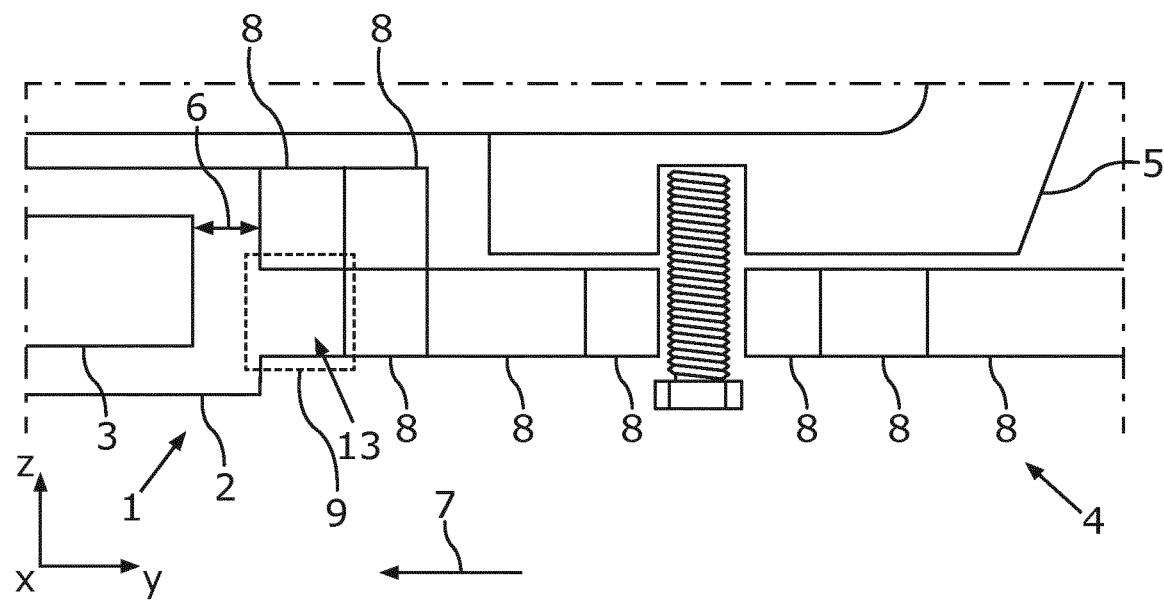
FIG. 5 is a schematic sectional view of the detail of the high-voltage storage device with the longitudinal member, which has a recess in the target deformation region, which was provided during a manufacturing process of the longitudinal member and by means of which the target deformation of the longitudinal member when a lateral force is applied to the longitudinal member is specified.

In the embodiment of the longitudinal member 4 shown in FIG. 5, it is provided that the longitudinal member 4 has a recess 13 in the target deformation region 9. The recess 13 of the longitudinal member 4 is to be understood to mean that when the longitudinal member 4 is manufactured as an extruded profile during an extrusion of the longitudinal member 4, the recess 13 is kept free. This means that in the region of the recess 13, the longitudinal member 4 is free of a profile 8. In this case, the recess 13 is arranged in the target deformation region 9. Via the recess 13, a deformation direction of the longitudinal member 4 when a force is applied laterally from outside to the longitudinal member 4 in the distance direction 7 can be specified particularly easily. In particular, the recess 13 can be selected in such a way that the stability of the longitudinal member 4 in the vehicle vertical direction z and in the vehicle longitudinal direction x is particularly high.

In particular, a longitudinal member 4 can be provided which has a plurality of target deformation regions 9, wherein it is possible to combine the plurality of target deformation regions 9 described in conjunction with FIGS. 1 to 5 in the case of the plurality of target deformation regions 9 provided.

The described high-voltage storage device 1 is based on the knowledge that kinetic energy to be dissipated in side crash tests is generally converted into deformation energy at a structure of the body-in-white 5 and/or the high-voltage storage device 1. In order to ensure sufficient safety of the high-voltage storage device 1 in the motor vehicle, a lateral so-called "survival space" of the battery cells 3, among other things, must not be encroached upon in the process. An auxiliary variable for determining the lateral survival space for the battery cells 3 is the so-called dynamic distance of the high-voltage storage device 1. The dynamic distance describes a remaining distance between longitudinal members 4 of the high-voltage storage device 1 that are opposite one another in the vehicle transverse direction y. This auxiliary variable of the dynamic distance serves to ensure requirements with regard to the safety of the high-voltage storage device 1 and should not be undershot. The safety distance 6 is specified via the dynamic distance. The survival space is specified via the safety distance 6.

As a result of the deformation energy occurring, block-forming components and/or geometric connections of components on the body-in-white 5 and/or the high-voltage storage device 1 in conjunction with a deformation direction occurring in each case in an accident deformation region can lead to a breach and thus to a failure to maintain the safety distance 6.

In order to control a direction of deformation and to avoid or reduce block formation in an accident deformation region of the high-voltage storage device 1, there are various approaches for constructing the longitudinal member 4 with a particularly large dynamic spacing when deformation of the longitudinal member 4 occurs. In the present case, the longitudinal member 4 is formed as a multi-chamber profile with a plurality of profiles 8. The longitudinal member 4 can be bolted to the body-in-white 5, whereby the high-voltage storage device 1 can be held on the body-in-white 5.

In the target deformation region 9, the longitudinal groove 11 and/or the milled portion 10 and/or the bore with the objective of weakening the profile can be provided at different points of a cross section of the longitudinal member 4, whereby positive control of a deformation direction of the longitudinal member 4 can be achieved. This targeted profile weakening can in particular only be provided locally in block-deformation regions, such as in particular in the region of bolt-on points. By means of the local milling and/or drilling and/or recesses 13 on the longitudinal member 4 of the high-voltage storage device 1, a positive clockwise rotation of the longitudinal member 4 and of a sill of the body-in-white 5 about the vehicle longitudinal direction x can be achieved, whereby a particularly large dynamic distance can be achieved.

Alternatively or additionally, as has already been described, a concave or convex profile shape of the particular profile 8 and/or a combination of a plurality of concave and/or convex profile shapes can be provided at different points of the cross section of the longitudinal member 4 in the corresponding target deformation region 9, whereby a positive control of the deformation direction of the longitudinal member 4 can be achieved. The concave and/or convex profile shapes can be provided in particular locally in block-deformation regions, in particular in the region of bolt-on points.

Furthermore, alternatively or additionally, a rising or falling geometry of the cross section of the longitudinal member 4 or a combination of a plurality of rising or falling geometries can be provided at different points of the cross section of the longitudinal member 4 in the at least one target deformation region 9, thereby enabling positive control of the deformation direction of the longitudinal member 4. In particular, the rising and falling geometries can be provided in local block-deformation regions, especially in the region of bolt-on points of the cross section of the longitudinal member 4.

Furthermore, trapezoidal geometries of the cross section of the longitudinal member 4 can be provided alternatively or additionally in the various target deformation regions 9. In particular, a plurality of different trapezoidal geometries of the longitudinal member 4 can be provided at different locations of the cross section of the longitudinal member 4, whereby a positive control of the deformation direction of the longitudinal member 4 can be achieved. In particular, the trapezoidal geometries of the cross section of the longitudinal member 4 can be provided in particular in local block-deformation regions, in particular in the region of bolt-on points.

Furthermore, alternatively or additionally, recesses 13 of the extruded profile, in particular a plurality of recesses 13 of the extruded profile, can be provided at different locations of the cross section of the longitudinal member 4 in the at least one target deformation region 9, whereby the positive control of the deformation direction can be achieved. In particular, the at least one recess 13 can be provided in a block-forming region of the cross section of the longitudinal member 4, in particular in the region of bolt-on points.

A specific construction of the longitudinal member 4 of the high-voltage storage device 1, in particular of a chamber structure of the longitudinal member 4, is thus provided in order to achieve positive control of the deformation direction of the longitudinal member 4. In addition, a block formation of components in an accident deformation region can be avoided or at least reduced in order to increase or optimize a dynamic distance.

Overall, the invention shows how a high-voltage storage profile can be optimized to increase a dynamic distance.

LIST OF REFERENCE SIGNS 1 high-voltage storage device
2 housing element
3 battery cell
4 longitudinal member
5 body-in-white
6 safety distance
7 distance direction
8 profile
9 target deformation region
10 milled portion
11 longitudinal groove
12 side wall
13 recess

The invention claimed is:
1. A high-voltage storage device for a motor vehicle, comprising:
a plurality of battery cells;
a housing element on which the battery cells are held;

at least one longitudinal member on which the housing element is held and which has a safety distance from the battery cells in a distance direction, wherein the longitudinal member has at least one target deformation region, via the design of which a target deformation of the longitudinal member in an event of a force action in the distance direction on the longitudinal member is defined such that the safety distance is maintained, and the longitudinal member, in the target deformation region, has at least one profile which runs at an incline to the distance direction and which has a concave cross section and/or a convex cross section, by which the target deformation is defined.

2. The high-voltage storage device according to claim 1, wherein the longitudinal member, in the target deformation region, has at least one longitudinal groove, a milled portion, and/or a bore, by which the target deformation is defined.

3. The high-voltage storage device to claim 1, wherein the longitudinal member, in the target deformation region, has at least one profile which runs at an incline to the distance direction and which has a cross-section rising in the distance direction and/or a cross-section falling in the distance direction, by which the target deformation is defined.

4. A high-voltage storage device for a motor vehicle, comprising:

a plurality of battery cells;

a housing element on which the battery cells are held;

at least one longitudinal member on which the housing element is held and which has a safety distance from the battery cells in a distance direction, wherein the longitudinal member has at least one target deformation region, via the design of which a target deformation of the longitudinal member in an event of a force action in the distance direction on the longitudinal member is defined such that the safety distance is maintained, and the longitudinal member, in the target deformation region, has at least one profile which runs at an incline to the distance direction and which has a trapezoidal cross-section, by which the target deformation is defined.

5. The high-voltage storage device according to claim 1, wherein the longitudinal member is an extruded profile and, in the target deformation region, has at least one recess, by which the target deformation is defined.

* * * * *